July 3, 1928.
D. E. REPLOGLE
CABLE SUPPORT
Filed Dec. 2, 1926
1,676,208
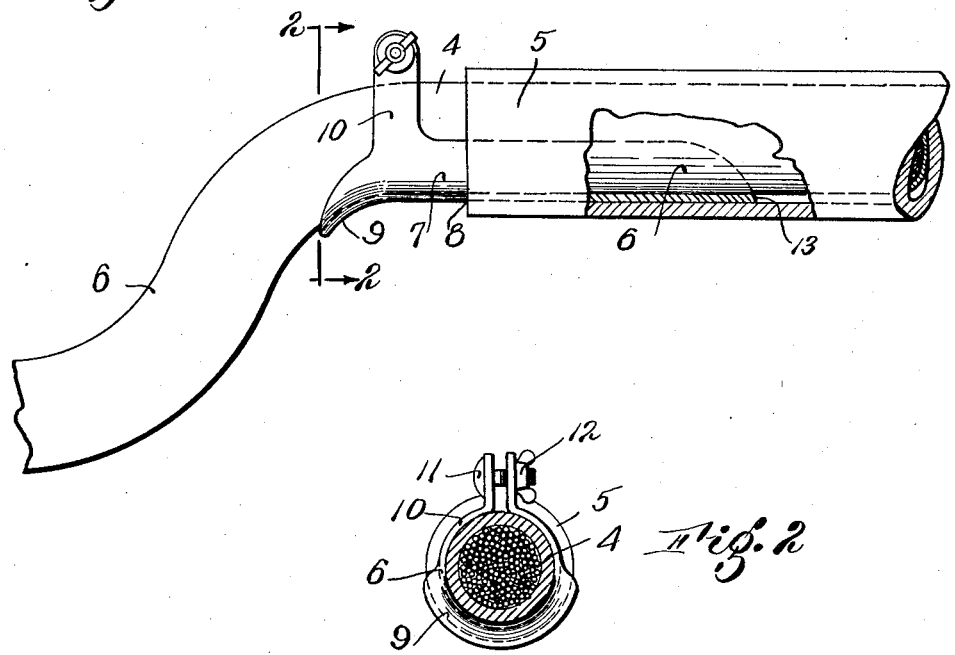
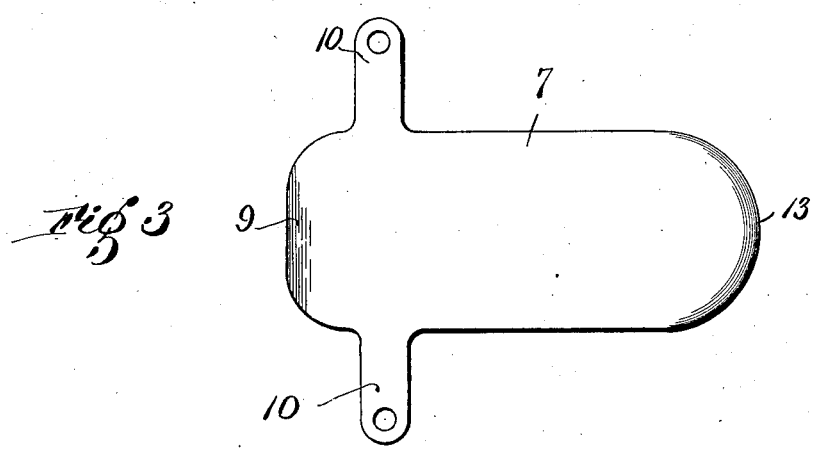
Inventor
Delbert E. Replogle
by Roberts, Cushman & Woodberry.
Attys.

Patented July 3, 1928.

1,676,208

UNITED STATES PATENT OFFICE.

DELBERT E. REPLOGLE, OF WATERTOWN, MASSACHUSETTS, ASSIGNOR TO ENGINEERING SPECIALTIES COMPANY, OF BOSTON, MASSACHUSETTS, A PARTNERSHIP OF MASSACHUSETTS.

CABLE SUPPORT.

Application filed December 2, 1926. Serial No. 152,178.

This invention relates to cable supports or fairleaders of the type adapted to protect the surface coating of power cables in the region adjacent the entrance or exit of a cable conduit or duct.

In the usual practice of laying subterranean power cables, the cables, which are customarily sheathed with a soft lead coating, are installed in horizontal conduits of fibre, tile or concrete which interconnect a series of manholes. The cables invariably sag or loop downwardly across the manholes with the result that the surface coating of the cable bears upon the lower edge of the mouth of the conduit with considerable pressure. It is well known that these cables are heated and cooled by variations in current, throughout the daily cycle of load changes, and consequently expand and contract longitudinally, the degree of expansion frequently amounting to an inch or more for each one hundred feet of cable. Such continual expansion and contraction causes the cable to wear upon the lip of the conduit with inevitable scraping away and ultimate destruction of the surface coating and the short-circuiting of the cable.

In order to protect the cable surface from injury resulting from the aforesaid longitudinal movement of the cable, it is one object of the present invention to provide a sleeve adapted to be inserted within the mouth of the conduit beneath the cable, and means for fastening the sleeve to the cable so that frictional wear between the moving elements takes place between the sleeve and the edge of the conduit. A further object includes the provision of a shoe for the cable extending outwardly from the mouth of the conduit and having a smooth downwardly curving outer lip, whereby the cable may slide a perceptible degree along the shoe without damage to its surface coating.

A preferred embodiment of a sleeve or fairleader having securing means connecting it with the cable is shown in the accompanying drawings, in which:

Fig. 1 is a fragmentary side view, partly in section, of a cable entering a conduit and provided with the protecting sleeve;

Fig. 2 is a transverse section taken on the line 2—2 of Fig. 1; and

Fig. 3 is a detail view showing a development of the fairleader illustrated in Figs. 1 and 2.

In Fig. 1 the cable 4 having the customary insulation and outer coating of soft lead or other covering is shown entering the conduit 5, as at a manhole, with a portion of the cable looping downwardly at 6 in its usual path across the manhole. The sleeve, shoe, or fairleader 7, consisting of a sheet of wear resisting metal and being transversely curved to receive the cable, is inserted between the cable and the conduit at the mouth 8. The outer end of the sleeve 7 projects beyond the end of the conduit and is preferably provided with a downwardly curved lip 9 and the inner portion of the sleeve extends a substantial distance within the conduit.

The sleeve is preferably secured to the cable, as by the integral ears or clamping straps 10 which extend around the cable and may be fastened together by a bolt 11 and wing nut 12, so that the sleeve is prevented from slipping longitudinally or circumferentially of the cable. As illustrated the straps 10 are integral with the sleeve and extend upwardly from the sides of the sleeve near the outer lip 9, but it is obvious that other clamping or fastening means may be employed, if desired.

The inner end of the fairleader may be curved, as shown in Fig. 3, and is preferably beveled at 13 to present a smooth surface to the cable sheathing. In order to prevent destruction of the sheathing by possible electrolysis, the sleeve may be of a metal, for example zinc, which is electro-negative with respect to the antimonious lead of the sheathing.

The fairleader above described is very durable in use, yet may be manufactured in quantities at small cost and with few operations. For example, a piece of sheet metal may be stamped in the form of the blank shown in Fig. 3 and the blank may then be fashioned into a semi-cylindrical form simultaneously with the formation of the belled outer lip 9 and beveled inner end 13. When clamped securely to the cable as illustrated in the drawings, the fairleader is not only prevented from falling out of the conduit but is held in such position that the entire wear at the edge 8 of the conduit is upon the outer surface of the sleeve and not upon the cable surface. Since the fairleader is readily replaceable at slight expense, a considerable saving in the maintenance of cables is thus effected, for the damage to the cable by scraping or rubbing upon the end of the conduit is entirely eliminated.

I claim:

1. A protective support for a power cable at the outer edge of the cable conduit to prevent wear on the surface of the cable due to the friction set up by the longitudinal movement of the cable over the edge of the conduit consisting of a sleeve inserted between the cable and the outer edge of the cable conduit, and means for fixedly securing the sleeve to the cable.

2. A protective support for a power cable at the outer edge of the cable conduit to prevent wear on the surface of the cable due to the friction set up by the longitudinal movement of the cable over the edge of the conduit consisting of a metallic sleeve receiving a portion of the cable and inserted beneath the cable between the cable and the end portion of the cable conduit, a portion of said sleeve extending outwardly beyond the end of the conduit, and means for fixedly securing the sleeve to the cable.

3. A protective support for a power cable at the outer edge of the cable conduit to prevent wear on the surface of the cable due to the friction set up by the longitudinal movement of the cable over the edge of the conduit consisting of a metallic sleeve receiving a portion of the cable and inserted beneath the cable between the cable and the end portion of the cable conduit, a portion of said sleeve extending outwardly beyond the end of the conduit, and said sleeve having straps extending from said projecting portion around the cable and said straps being fastened together so that the sleeve is prevented from movement longitudinally of the cable.

4. A protective support for a power cable at the outer edge of the cable conduit to prevent wear on the surface of the cable due to the friction set up by the longitudinal movement of the cable over the edge of the conduit consisting of a metallic sleeve adapted to receive a portion of the cable and to fit between the cable and the cable conduit at the outer end of the conduit, a portion of said sleeve extending outwardly beyond the end of the conduit and having a downwardly belled lip, and means for fixedly securing the sleeve to the cable.

5. Means for protecting a power cable from frictional wear due to the longitudinal movement of the cable over a support, comprising a substantially semi-cylindrical sleeve and means for securing said sleeve from movement relative to said cable whereby any frictional wear due to the longitudinal movement of the cable over said support will take place between said sleeve and said support.

6. Means for protecting a power cable from wear due to the longitudinal movement of the cable over a support by reason of the continual expansion and contraction of the cable by variations of the current therethrough, comprising a substantially semi-cylindrical sleeve and means integral with said sleeve for securing said sleeve from movement relative to said cable whereby any frictional wear due to the longitudinal movement of said cable over said support will take place between said sleeve and said support.

Signed by me at Cambridge, Massachusetts, this 30th day of November, 1926.

DELBERT E. REPLOGLE.